UNITED STATES PATENT OFFICE.

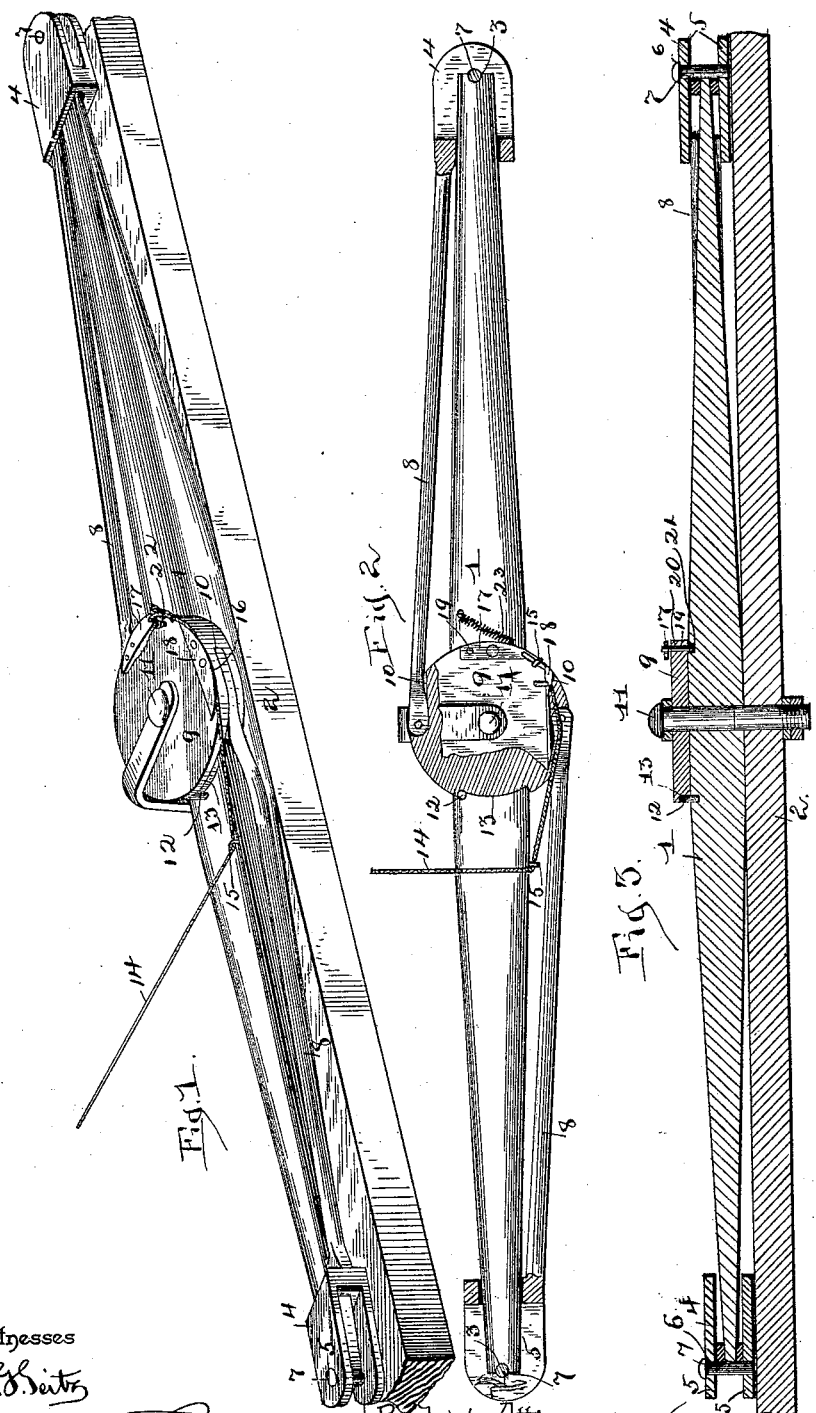

JOHN H. GARNER, OF KINGWOOD, WEST VIRGINIA.

HORSE-DETACHER.

SPECIFICATION forming part of Letters Patent No. 457,346, dated August 11, 1891.

Application filed March 23, 1891. Serial No. 386,100. (No model.)

*To all whom it may concern:*

Be it known that I, JOHN H. GARNER, a citizen of the United States, residing at Kingwood, in the county of Preston and State of West Virginia, have invented a new and useful Horse-Detacher, of which the following is a specification.

The invention relates to improvements in horse-detachers.

The object of the present invention is to provide a simple and inexpensive horse-detacher adapted to readily release the traces from a whiffletree to prevent accidents from runaways and to enable a horse to be quickly released from a vehicle.

The invention consists in the construction and novel combination and arrangement of parts hereinafter fully described, illustrated in the accompanying drawings, and pointed out in the claims hereto appended.

In the drawings, Figure 1 is a perspective view of a whiffletree provided with a horse-detacher constructed in accordance with this invention. Fig. 2 is a plan view partly in section. Fig. 3 is a longitudinal sectional view.

Referring to the accompanying drawings, 1 designates a whiffletree, which is pivoted in the usual manner to the cross-bar 2 of a pair of shafts and which has its ends provided with notches 3 and adapted to receive the opening of a trace, and the latter is retained on the whiffletree by a sliding casing 4. The sliding casing 4 consists of top and bottom plates 5, which are provided near their outer ends with perforations 6, adapted for the reception of a pin 7. The pin 7 passes through the perforations 6 of the plates 5, and when the casing is in operative position for securing a trace the pin is arranged in the notch 3 of the whiffletree and prevents the trace slipping off the end of the whiffletree. The casings at the ends of the whiffletree are adapted to slide outward to push the trace off the end of the whiffletree to release an animal, and they are cast integral with rods 8, which connect them with a disk 9. The rods 8 have their inner ends pivoted in peripheral recesses 10 of the disk 9, and the latter is pivotally mounted on the whiffletree and is secured thereto by the bolt 11, which also pivots the whiffletree to the cross-bar 2. The recesses 10 are arranged at diametrically-opposite points, and it will be seen that by partially rotating the disk the casings 4 are forced outward and drawn inward. The rotation of the disk is limited by a projection or pin 12, extending from the upper face of the whiffletree and engaging a recess 13 in the periphery of the disk 9.

The disk is operated by a cord 14, extending from the seat of the vehicle to the disk and passing through guide-eyes 15 and arranged in a groove 16 and having one end secured to a pivoted plate 17. The groove 16 is formed by a plate or enlargement 18 of the disk 9, and the plate 17 is centrally pivoted and has one end connected with the cord 14 and the other end attached to the upper end of a pin 19, which is vertically disposed and arranged in an opening 20 of the disk 9 and adapted to engage a socket 21 of the whiffletree 1 to secure the disk rigid with the whiffletree and prevent the former accidentally rotating and releasing the animal. The end to which the cord is attached is normally held elevated by a spring 22 to maintain the pin in engagement with the socket, and the spring 22 is secured to the disk and interposed between the same and the plate 17. When the cord is pulled upon, the pin is lifted out of engagement with the socket of the whiffletree and the disk is released, and by a continued pulling of the cord the disk is rotated and the device is operated to release the traces. When the disk has been operated by the cord, it is returned to its normal position by a spring 23, having one end secured to the whiffletree and the other end attached to the disk.

It will be readily seen that the horse-detacher is simple and inexpensive, strong and durable, and adapted to be readily applied to the ordinary whiffletree and capable of readily releasing the traces, whereby accidents and injury to occupants and vehicles by runaways are prevented.

The traces may be readily secured to the whiffletree and removed therefrom by removing the pins from the casings.

What I claim is—

1. The combination, with a whiffletree, of the disk pivotally mounted thereon, the casing arranged at the ends of the whiffletree and sliding thereon and adapted to retain traces on the ends of the whiffletree and force them off, the rods connecting the casings and the disk, the plate pivoted to the disk and provided at one end with a pin arranged to engage the whiffletree, and a spring engaging the other end of the plate and normally holding the pin into engagement with the whiffletree, substantially as described.

2. The combination, with the whiffletree provided at its ends with notches, of the disk pivotally mounted on the whiffletree, the casing sliding on the ends of the whiffletree and comprising the top and bottom plates provided with perforations and the pin arranged in the perforations, and the rods connecting the disk and the casings, substantially as described.

3. The combination, with a whiffletree provided with a socket 21, of the disk pivotally mounted on the whiffletree and having an opening and provided with a peripheral groove 16 and with a peripheral recess 13, the projection 12, extending from the whiffletree and engaging the recess 13, the plate pivotally mounted on the disk and provided at one end with a pin arranged in the opening of the disk and arranged to engage the socket of the whiffletree, the spring engaging the other end of the plate, and the cord arranged in the groove 16 and secured to the plate and extending to the seat of the vehicle, substantially as described.

In testimony that I claim the foregoing as my own I have hereto affixed my signature in presence of two witnesses.

JOHN H. GARNER.

Witnesses:
J. C. SIGGERS,
R. J. MARSHALL.